United States Patent
Busch et al.

(10) Patent No.: US 7,670,544 B2
(45) Date of Patent: Mar. 2, 2010

(54) USE OF POLYPROPYLENE FILMS FOR IN-MOLD LABELLING

(75) Inventors: Detlef D. Busch, Saarlouis (DE); Karl-Heinz Kochem, Neunkirchen (DE); Bertram Schmitz, Sarreguemines (FR); Wilfrid Tews, Bechhofen (DE)

(73) Assignee: Treofan Germany GmbH & Co. KG (DE)

( * ) Notice: Subject to any disclaimer, the term of this patent is extended or adjusted under 35 U.S.C. 154(b) by 929 days.

(21) Appl. No.: 10/511,951

(22) PCT Filed: Mar. 28, 2003

(86) PCT No.: PCT/EP03/03233

§ 371 (c)(1),
(2), (4) Date: Oct. 21, 2004

(87) PCT Pub. No.: WO03/091316

PCT Pub. Date: Nov. 6, 2003

(65) Prior Publication Data

US 2005/0212183 A1  Sep. 29, 2005

(30) Foreign Application Priority Data

Apr. 24, 2002  (DE) .............................. 102 18 246

(51) Int. Cl.
B29C 49/24  (2006.01)

(52) U.S. Cl. ...................................................... 264/509
(58) Field of Classification Search .................. 264/509
See application file for complete search history.

(56) References Cited

U.S. PATENT DOCUMENTS

| | | | |
|---|---|---|---|
| 4,769,205 A * | 9/1988 | Oles et al. .................... 264/509 |
| 5,231,126 A | 7/1993 | Shi et al. | |
| 5,254,302 A | 10/1993 | Yamanaka | |
| 6,228,316 B1 * | 5/2001 | Moseley, III ................ 264/509 |
| 6,815,048 B2 * | 11/2004 | Davidson et al. ......... 428/315.5 |

FOREIGN PATENT DOCUMENTS

| | | |
|---|---|---|
| DE | 44 20 989 | 12/1995 |
| EP | 0 546 741 | 6/1993 |
| EP | 0 557 721 | 9/1993 |
| EP | 0 559 484 | 9/1993 |
| EP | 0 865 909 | 9/1998 |
| WO | WO-99/55518 | 11/1999 |
| WO | WO-00/12288 | 3/2000 |

* cited by examiner

*Primary Examiner*—Suzanne E. McDowell
(74) *Attorney, Agent, or Firm*—Connolly Bove Lodge & Hutz LLP

(57) ABSTRACT

The invention relates to the use of a biaxially oriented microporous film, which contains a propylene polymer and at least one β-nucleating agent and whose microporosity is produced by converting β-crystalline polypropylene when drawing the film, in order to label containers during blow molding.

17 Claims, 2 Drawing Sheets

USE OF POLYPROPYLENE FILMS FOR IN-MOLD LABELLING

Figure 1A:
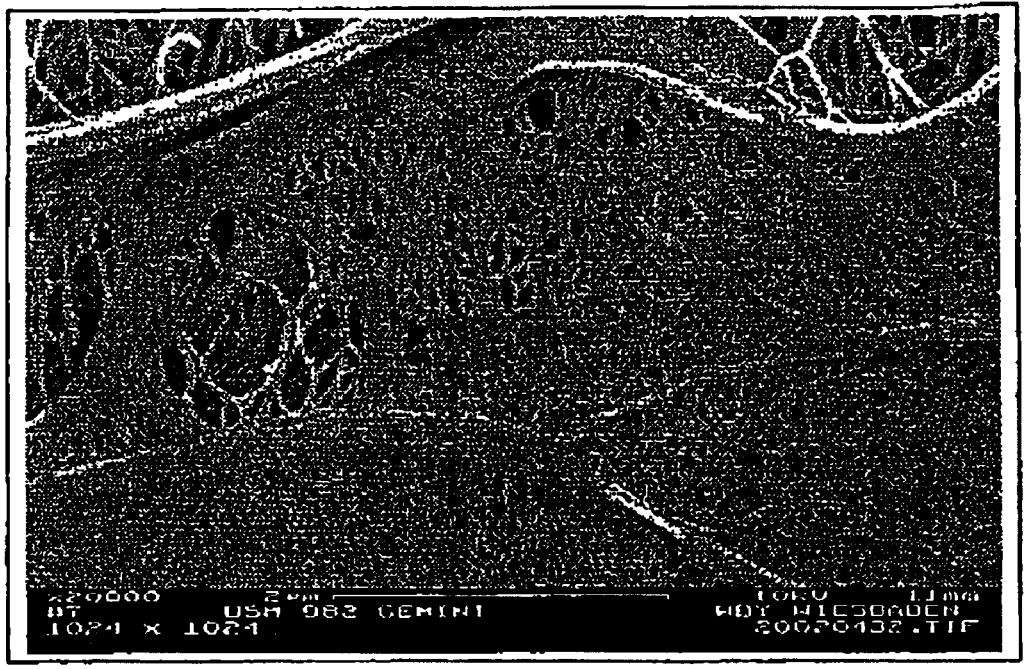

The present invention relates to the use of a biaxially oriented polypropylene film as in-mould label in blow moulding.

RELATED APPLICATIONS

This application is a national stage application (under 35 U.S.C. 371) of PCT/EP03/03233 filed Mar. 28, 2003 which claims benefit to German application Serial No. 102 18 246.9 filed Apr. 24, 2002.

Label films cover an extensive and technically complex area. A distinction is made between various labelling techniques, which differ fundamentally with respect to the process conditions and inevitably make different technical requirements of the label materials. A common feature of all labelling processes is that the end result must be containers labelled in a visually appealing manner in which good adhesion to the labelled container must be ensured.

In the labelling processes, very different techniques are used to apply the label. A distinction is made between self-adhesive labels, wrap-around labels, shrink labels, in-mould labels, patch labelling, etc. The use of a thermoplastic film as label is possible in all these different labelling processes.

In in-mould labelling too, a distinction is made between different techniques in which different process conditions are used. A common feature of all in-mould labelling processes is that the label participates in the actual container shaping process and is applied during the latter. However, very different shaping processes are used here, such as, for example, the injection-moulding process, the blow-moulding process and the thermoforming process.

In the injection-moulding process, a label is laid in the injection mould and a molten plastic is injected onto the back. Due to the high temperatures and pressures, the label bonds to the injection moulding and becomes an integral, non-detachable part of the moulding. This process is used to produce, for example, tubs and lids of ice cream or margarine tubs.

In this process, individual labels are taken from a stack or cut from a roll and laid in the injection mould. The mould here is designed in such a way that the melt stream is injected behind the label and the front of the film is in contact with the wall of the injection mould. During injection, the hot melt bonds to the label. After injection, the mould opens and the moulding with label is ejected and cools. In the result, the label must adhere to the container in a fold-free and visually perfect manner.

During injection, the injection pressure is in the range from 300 to 600 bar. The plastics used have a melt flow index of around 40 g/10 min. The injection temperatures depend on the plastic employed. In some cases, the mould is additionally cooled and to avoid the moulding sticking to the mould.

In the case of thermoforming, unoriented, thick plastic sheets, usually cast PP or PS, in a thickness of about 200 μm are warmed and drawn or pressed into a corresponding mould by means of vacuum or male moulds. Here too, the individual label is laid in the mould and bonds to the actual container during the moulding process. Considerably lower temperatures are used, meaning that adhesion of the label to the container may be a critical factor. Good adhesion must be ensured even at these low processing temperatures. The processing speeds in this process are lower than in injection moulding.

Direct in-mould labelling is also possible in blow moulding of containers or hollowware. In this process, a melt tube is extruded vertically downwards through an annular die. A vertically divided mould closes and surrounds the tube, which is squeezed at the lower end in the process. At the upper end, a blowing mandrel is inserted, forming the opening of the moulding. Air is fed to the warm melt tube via the blowing mandrel, causing it to expand and come into contact with the inside walls of the mould. In the process, the label must bond to the viscous plastic of the melt tube. The mould is subsequently opened, and the excess length is cut off at the shaped opening. The shaped and labelled container is ejected and cools.

In these blow-moulding processes, the pressure during inflation of the melt tube is about 4-15 bar and the temperatures are significantly lower than in injection moulding. The plastic materials have a lower MFI than in injection moulding in order to form a dimensionally stable melt tube and therefore behave differently during the cooling process than the low-viscosity materials for injection moulding.

In these blow-moulding processes too, biaxially oriented films made from thermoplastics are increasingly being employed for the labelling of containers during moulding. For this purpose, the films must have a selected property profile in order to ensure that the label film and the blown moulding come into smooth and bubble-free contact with one another and bond to one another. Various solutions have been proposed for this in the prior art.

For example, it is known from the prior art that air inclusions, which, as large bubbles, impair the appearance and adhesion, can be reduced in in-mould blow moulding by a particular surface roughness of the film.

To this end, the film must have a roughness on the side facing the container in the μm range which enables expulsion of the air during labelling. Such roughnesses are produced, for example, by a special formulation of the top layer of multilayered films or by structuring of the surface.

Thus, U.S. Pat. No. 5,254,302 describes a BOPP film whose reverse side has been modified by embossing a defined surface structure. After the embossing, the film is coated on this side with a hot-melt adhesive system in such a way that the surface structure is retained. The adhesive system ensures adhesion of the label film to the moulding, and the structured surface prevents the formation of bubbles.

U.S. Pat. No. 4,986,866 describes a multilayered, paper-like label film having a heat-sealable top layer which is mechanically embossed by means of rolls before the stretching process. Here too, this surface structure is intended to ensure air removal and facilitate bubble-free adhesion of the label.

DE 199 49 898 describes the use of a polypropylene film having an average roughness of at least 3.5 μm for labelling in the blow-moulding process. This roughness is produced by a polypropylene mixture in the top layer, this mixture consisting of polypropylene and incompatible or partially compatible thermoplastic polymers.

In addition to these bubbles, a further independent undesired effect which occurs during blow-mould labelling is the formation of a so-called orange peel. This effect has nothing to do with the large bubbles formed by poor air removal. Orange peel does not appear in the form of individual bubbles of varying size, but instead the entire label surface is uneven with a certain regularity, so that the appearance is very similar to the surface structure of an orange, and is therefore frequently known as orange peel. This defect is sometimes also known as leathery effect. Various solutions have been proposed for reducing the orange-peel effect. One development direction is based on the assumption that the orange peel is formed due to shrinkage of the blow-moulded container during cooling. On the other hand, the mouldings in in-mould injection moulding also shrink very considerably during cooling, but this process is very much less susceptible to interfering orange-peel effects.

EP 0 559 484 describes a film for in-mould labelling, with no distinction being made between in-mould injection moulding and in-mould blow mould. The film has a top layer of polyethylene and fillers which is applied to a vacuole-containing base layer. The polyethylene layer faces the container, and further layers may be applied to the opposite outside. According to this teaching, the occurrence of a leathery effect can be concealed by further pigmented outer layers.

EP 0 546 741 describes a film having a vacuole-containing top layer which is applied to a non-vacuole-containing base layer. The vacuole-containing top layer faces the container during the in-mould process. According to this teaching, the orange peel is formed due to shrinkage of the vacuole-containing label film during injection moulding and can be avoided by preventing excessive vacuole formation and reducing the filler content of the film.

By contrast, WO00/12288 teaches that controlled concomitant shrinkage of the label results in the occurrence of less orange peel and proposes improving the orange-peel effect during blow moulding by means of certain shrinkage properties of the film. According to this proposal, the in-mould label film should have a shrinkage of at least 4% in both directions at 130° C. and 10 min. This shrinkage results in the formation of less orange peel during blow-mould labelling. However, this teaching at the same time confirms that an excessively low density in turn results in increased orange-peel formation. It is therefore additionally recommended that the density of the film be kept in the range from 0.65 to 0.85 g/cm$^3$.

In practice, it is found that all blow-moulding processes are significantly more susceptible to orange-peel effects during labelling than the processes of in-mould labelling during injection moulding.

None of the known teachings solve the problem of the formation of orange peel on use of biaxially oriented films in in-mould blow moulding to a satisfactory extent or they have other serious disadvantages. Although the measures proposed exhibit reliable results in some cases in injection-moulding applications, the appearance of the label on the container in the blow-moulding process is still unsatisfactory and considerably impaired by orange peel.

EP 0 865 909 describes the use of "microvoided" films for labels. The film comprises a β-nucleating agent, which, on cooling of the melt film, produces an increased proportion of β-crystalline polypropylene in the pre-film. On stretching of the pre-film, "microvoids" are produced. It is described that the film has good printability.

The object of the present invention was to provide a label film which does not have an orange peel in in-mould labelling in the blow-moulding process.

The object on which the invention is based is achieved by the use of a biaxially oriented microporous film which comprises polypropylene and β-nucleating agent and whose microporosity is generated by conversion of β-crystalline polypropylene during stretching of the film, for the labelling of containers during blow moulding.

It has been found that a film having a microporous layer can be used very successfully in blow-mould labelling and absolutely no orange peel occurs under a wide variety of process conditions if this microporosity is generated indirectly by means of β-nucleating agents. These structures produced in this way differ significantly from those of conventional vacuole-containing films.

Figure 2A:
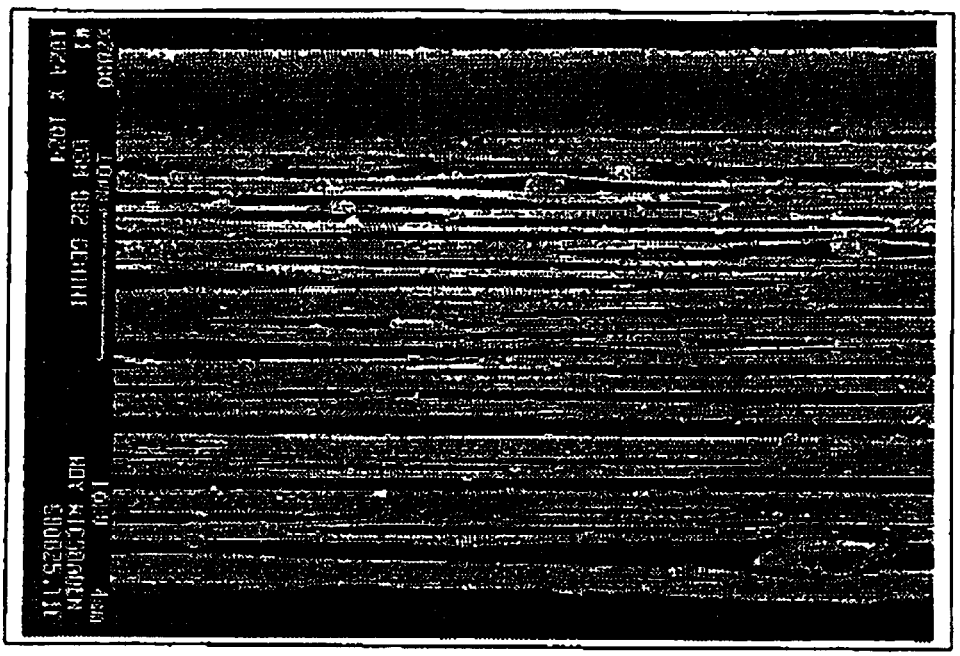
Figure 2B:
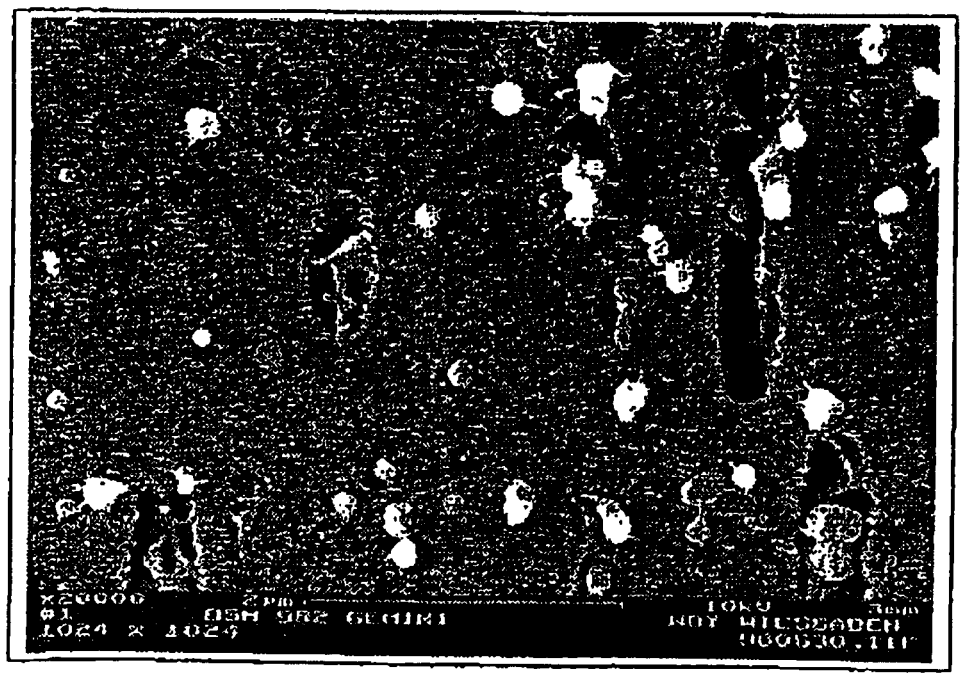

FIGS. 2a and 2b show the typical structure of a vacuole-containing layer in cross section (2a) and in plan view (2b). The incompatibility of the vacuole-initiating particles causes tears between the surface of the particle and the polymer matrix during stretching, and a closed air-filled cavity forms, which is referred to as vacuoles. These vacuoles are distributed throughout the layer and reduce the density of the films or of the layer. However, these films still exhibit a good barrier action, for example against water vapour, since the vacuoles are closed and the structure as a whole is impermeable.

By contrast, the porous layer is gas-permeable and exhibits, as is evident from FIGS. 1a (plan view) and 1b (cross section), an open-pored network structure. This structure does not form due to incompatible fillers, but instead by a technically completely different process. The microporous layer comprises polypropylene and β-nucleating agent. This mixture of polypropylene and β-nucleating agent is firstly, as usual in film production, melted in an extruder and extruded through a slot die as a melt film onto a chill roll. The β-nucleating agent promotes crystallization of β-crystalline polypropylene during cooling of the melt film, so that an unstretched pre-film having a high content of β-crystalline polypropylene forms. During stretching of this pre-film, the temperature and stretching conditions can be selected so that the β-crystallites are converted into the thermally more stable alpha phase of the polypropylene. Since the density of the β-crystallites is lower, this conversion is accompanied by volume shrinkage and thus results in the characteristic porous structure, similar to a torn-open network.

Both processes are known per se from the prior art. Surprisingly, it has been found that a film having a porous layer does not have an orange peel if it is employed as label film in the blow-moulding process. Opaque films having a vacuole-containing layer produce the undesired orange peel in the blow-moulding process.

The composition of the microporous layer, also referred to as layer below, is now described in greater detail. The microporous layer comprises propylene homopolymer and/or a propylene block copolymer, if desired additionally other polyolefins, and at least one β-nucleating agent, and, if desired, additionally conventional additives, for example stabilizers, neutralizers, lubricants, antistatics and pigments in effective amounts in each case. In general, additional incompatible vacuole-initiating fillers, such as calcium carbonate or polyesters, such as PET or PBT, are omitted, so that the layer comprises less than 5% by weight, preferably from 0 to at most 1% by weight, of these vacuole-initiating fillers. Such small amounts may enter the layer, for example, via the incorporation of film regrind.

In general, the layer comprises at least 70% by weight, preferably from 80 to 99.95% by weight, in particular from 90 to 97% by weight, of a propylene homopolymer and/or propylene block copolymer and from 0.001 to 5% by weight, preferably from 0.1 to 3% by weight, of at least one β-nucleating agent, in each case based on the weight of the layer.

Suitable propylene homopolymers comprise from 80 to 100% by weight, preferably from 90 to 100% by weight, of propylene units and have a melting point of 140° C. or above, preferably from 150 to 170° C., and generally a melt flow index of from 0.5 to 10 g/10 min, preferably from 2 to 8 g/10 min, at 230° C. and a force of 2.16 kg (DIN 53735). Isotactic propylene homopolymers having an atactic content of 15% by weight or less are preferred propylene polymers for the layer, with isotactic propylene homopolymer being particularly preferred.

Suitable propylene block copolymers comprise predominantly, i.e. more than 50% by weight, preferably from 70 to 99% by weight, in particular from 90 to 99% by weight, of propylene units. Suitable comonomers in corresponding amount are ethylene, butylene or higher alkene homologues, amongst which ethylene is preferred. The melt flow index of the block copolymers is in the range from 1 to 15 g/10 min, preferably from 2 to 10 g/10 min. The melting point is above 140° C., preferably in the range from 150 to 165° C.

The percentages by weight indicated are based on the respective polymer.

Mixtures of propylene homopolymer and propylene block copolymer comprise these two components in any desired mixing ratios. The ratio of propylene homopolymer to propylene block copolymer is preferably in the range from 10:90 to 90:10, preferably from 20:70 to 70:20. Such mixtures of homopolymer and block copolymer are particularly preferred and improve the appearance of the microporous layer.

If desired, the porous layer may comprise other polyolefins in addition to the propylene homopolymer and/or propylene block copolymer. The proportion of these other polyolefins is generally less than 30% by weight, preferably in the range from 1 to 20% by weight. Other polyolefins are, for example, random copolymers of ethylene and propylene having an ethylene content of 20% by weight or less, random copolymers of propylene with $C_4$-$C_8$-olefins having an olefin content of 20% by weight or less, terpolymers of propylene, ethylene and butylene having an ethylene content of 10% by weight or less and having a butylene content of 15% by weight or less, or polyethylenes, such as HDPE, LDPE, VLDPE, MDPE and LLDPE.

Suitable β-nucleating agents for the microporous layer are basically all known additives which promote the formation of β-crystals on cooling of a polypropylene melt. β-nucleating agents of this type, and also their mode of action in a polypropylene matrix, are known per se from the prior art and are described in detail below.

Various crystalline phases of polypropylene are known. On cooling of a melt, the α-crystalline PP, whose melting point is about 158-162° C., usually forms predominantly. By means of a particular temperature programme, a small proportion of β-crystalline phase, which has a significantly lower melting point of 148-150° C. compared with the monoclinic α-modification, can be produced on cooling. Additives are known from the prior art which result in an increased proportion of the β-modification when the polypropylene crystallizes out, for example γ-quinacridones, dihydroquinacridines or calcium salts of phthalic acid.

For the purposes of the present invention, highly active β-nucleating agents which produce a β-content of 30-90%, preferably of 50-80%, on cooling of the melt film are preferably employed in the porous layer. Suitable for this purpose is, for example, a two-component nucleation system comprising calcium carbonate and organic dicarboxylic acids which is described in DE 3610644, which is expressly incorporated herein by way of reference. Particularly advantageous are calcium salts of dicarboxylic acids, such as calcium pimelate or calcium suberate, as described in DE 4420989, which is likewise expressly incorporated herein by way of reference. The dicarboxamides described in EP-0557721, in particular N,N-dicyclohexyl-2,6-naphthalenedicarboxamides, are also suitable β-nucleating agents.

In addition to the nucleating agents, the maintenance of a certain temperature range and residence times at these temperatures is important for achieving a high content of β-crystalline polypropylene. The cooling of the melt film preferably takes place at a temperature of from 60 to 130° C., in particular from 80 to 120° C. Slow cooling likewise promotes the growth of the β-crystallites, therefore the take-off rate, i.e. the rate at which the melt film runs over the first chill roll, should be slow in order that the requisite residence times at the selected temperatures are sufficiently long. The take-off rate is preferably less than 25 m/min, in particular from 1 to 20 m/min.

Particularly preferred embodiments comprise from 0.001 to 5% by weight, preferably from 0.05 to 0.5% by weight, in particular from 0.1 to 0.3% by weight, of calcium pimelate or calcium suberate in the microporous layer comprising propylene homopolymer.

In general, the microporous label film is single-layered and consists only of the microporous layer. However, it goes without saying that this single-layered film can, if desired, be provided with a print or a coating before it is employed as label film in blow moulding. For single-layered embodiments of this type, the thickness of the film, i.e. of the porous layer, is in the range from 20 to 100 μm, preferably from 30 to 80 μm.

If desired, the microporous layer can be provided on the outside with a corona, flame or plasma treatment in order to improve the adhesion to printing inks or coatings.

The density of the microporous layer is generally in the range from 0.2 to 0.85 g/cm$^3$, preferably from 0.3 to 0.6 g/cm$^3$, with a density of less than 0.5 g/m$^3$ being preferred. Surprisingly, it has been found that a particularly low density does not result, as in the case of vacuole-containing, opaque films, in an increase in the orange-peel effect. Concerning vacuole-containing, opaque films, relevant specifications teach that an excessively low density results in an increased orange-peel effect due to excessive voiding. Surprisingly, this is not the case for porous films. The density can be reduced to extremely low values and the film can nevertheless be applied perfectly during blow moulding without an interfering orange peel occurring.

In a further embodiment, the microporous layer can be provided with a further top layer, with the microporous layer, on use in accordance with the invention of this multilayered embodiment, facing the container and bonding to the moulding during blow moulding. The additional top layer correspondingly forms the outside. The additional top layer can be applied, for example, by lamination of the porous layer to a further film. This is preferably a coextruded top layer.

The optionally coextruded top layer generally comprises at least 70% by weight, preferably from 75 to <100% by weight, in particular from 90 to 98% by weight, of a polyolefin, preferably of a propylene polymer and optionally further conventional additives, such as neutralizers, stabilizer, antistatics, lubricants, for example fatty acid amides or siloxanes, or antiblocking agents in effective amounts in each case.

The propylene polymer of the top layer is, for example, a propylene homopolymer, as already described above for the porous layer, or a copolymer of propylene and ethylene or propylene and butylene or propylene and another olefin having from 5 to 10 carbon atoms. For the purposes of the invention, terpolymers of ethylene and propylene and butylene or ethylene and propylene and another olefin having from 5 to 10 carbon atoms are also suitable for the top layer. It is furthermore possible to employ mixtures or blends of two or more of the said copolymers and terpolymers.

For the top layer, preference is given to random ethylene-propylene copolymers and ethylene-propylene-butylene terpolymers, in particular random ethylene-propylene copolymers having an ethylene content of from 2 to 10% by weight, preferably from 5 to 8% by weight, or random ethylene-propylene-1-butylene terpolymers having an ethylene content of from 1 to 10% by weight, preferably from 2 to 6% by weight, and a 1-butylene content of from 3 to 20% by weight, preferably from 8 to 10% by weight, in each case based on the weight of the copolymer or terpolymer.

The random copolymers and terpolymers described above generally have a melt flow index of from 1.5 to 30 g/10 min, preferably from 3 to 15 g/10 min. The melting point is in the range from 105° C. to 140° C. The above-described blend of copolymers and terpolymers has a melt flow index of from 5 to 9 g/10 min and a melting point of from 120 to 150° C. All the melt flow indices indicated above are measured at 230° C. and a force of 2.16 kg (DIN 53735).

The thickness of this top layer is generally in the range from 1 to 5 μm. If desired, the surface of this top layer can be provided with a corona, flame or plasma treatment in order to improve the printability. The density of the film is only increased insignificantly by the non-porous top layer, which also contains no vacuoles, compared with single-layered embodiments and is therefore also generally in the range from 0.25 to 0.8 g/cm3, preferably from 0.25 to 0.6 g/cm3, in particular <0.5 g/cm3, for these embodiments.

If desired, the top layer may additionally comprise conventional additives, such as stabilizers, neutralizers, antiblocking agents, lubricants, antistatics, etc., in conventional amounts in each case.

The porous film for the use according to the invention is preferably produced by the extrusion process or coextrusion process known per se.

In this process, the polypropylene, which is mixed with β-nucleating agent, is melted in an extruder and extruded through a flat-film die onto a take-off roll, on which the melt solidifies with formation of the β-crystallites. In the case of the two-layered embodiment, the corresponding coextrusion is carried out together with the top layer. The cooling temperatures and cooling times are selected so that the highest possible content of β-crystalline polypropylene forms in the pre-film. Subsequently, this pre-film having a high content of β-crystalline polypropylene is biaxially stretched in such a way that conversion of the β-crystallites into alpha polypropylene occurs during the stretching. The biaxially stretched film is finally heat-set and optionally corona-, plasma- or flame-treated on one surface.

The biaxial stretching (orientation) is generally carried out successively, with stretching preferably first being carried out longitudinally (in the machine direction) and then transversely (perpendicular to the machine direction).

The take-off roll or take-off rolls are held at a temperature of from 60 to 130° C., preferably from 80 to 120° C., in order to promote the formation of a high content of β-crystalline polypropylene.

During stretching in the longitudinal direction, the temperature is less than 140° C., preferably from 90 to 125° C. The stretching ratio is in the range from 3:1 to 5:1. The stretching in the transverse direction is carried out at a temperature of greater than 140° C., preferably from 145 to 160° C. The transverse stretching ratio is in the range from 3:1 to 6:1.

The longitudinal stretching will advantageously be carried out with the aid of two rolls running at different speeds corresponding to the target stretching ratio, and the transverse stretching will advantageously be carried out with the aid of a corresponding tenter frame.

The biaxial stretching of the film is generally followed by heat-setting (heat treatment) thereof, during which the film is held at a temperature of from 110 to 150° C. for from about 0.5 to 10 s. The film is subsequently wound up in a conventional manner using a wind-up device.

Preferably, as mentioned above, the biaxial stretching is usually followed by corona-, plasma- or flame-treatment of one surface of the film by one of the known methods.

For the alternative corona treatment, the film is passed between two conductor elements serving as electrodes, with such a high voltage, usually an alternating voltage (about 10,000 V and 10,000 Hz), being applied between the electrodes that spray or corona discharges can occur. The spray or corona discharge causes the air above the film surface to ionize and react with the molecules of the film surface, so that polar inclusions form in the essentially nonpolar polymer matrix. The treatment intensities are in the usual range, with from 38 to 45 mN/m being preferred.

Figure 1B:
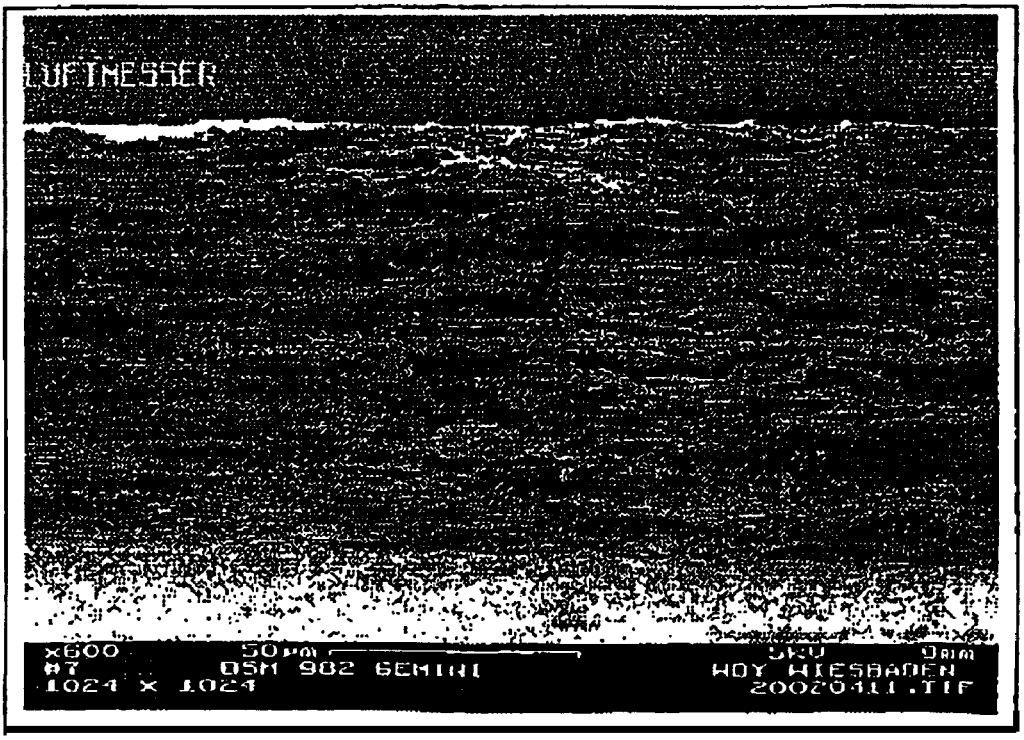

This process gives a porous film having an opaque appearance. The porous layer has a network-like structure (see FIGS. 1a and 1b) which is permeable to gases. In general, these films have a Gurely value in the region >50 sec. and a porosity in the range from 5 to 80%.

In accordance with the invention, the porous film is employed in the blow-moulding process. Details of the blow-moulding process have already been described above in connection with the prior art. The porous film is preferably used for labelling of polyethylene containers during blow moulding.

Suitable blow-moulding processes are also described, for example, in ISDN 3-446-15071-4, which is expressly incorporated herein by way of reference.

The raw materials and films were characterized using the following measurement methods:

Melt Flow Index

The melt flow index of the propylene polymers was measured in accordance with DIN 53 735 at a load of 2.16 kg and 230° C. and at 190° C. and 2.16 kg for polyethylenes.

Melting Points

DSC measurement, maxima of the melting curve, heating rate 20 K/min.

Density

The density is determined in accordance with DIN 53 479, Method A.

The invention is now explained by the following examples.

EXAMPLE 1

A single-layered film was extruded by the extrusion process from a flat film die at an extrusion temperature of 245° C. The film had the following composition:

about 50% by weight of propylene homopolymer (PP) having an n-heptane-soluble content of 4.5% by weight (based on 100% PP) and a melting point of 165° C.; and a melt flow index of 3.2 g/10 min at 230° C. and a load of 2.16 kg (DIN 53 735) and about 49% by weight of propylene-ethylene block copolymer having an ethylene content of about 5% by weight, based on the block copolymer, and an MFI (230° C. and 2.16 kg) of 6 g/10 min 0.1% by weight of Ca pimelate as β-nucleating agent.

The film additionally comprised stabilizer and neutralizer in conventional amounts.

After extrusion, the molten polymer mixture was taken off over a first take-off roll and a further triple roll and solidified, subsequently stretched longitudinally, stretched transversely and set, with in detail the following conditions being selected:

| | |
|---|---|
| Extrusion: | Extrusion temperature 245° C. |
| Chill roll: | Temperature 125° C., residence time on the take-off roll 55 sec. |
| Longitudinal stretching: | Stretching roll T = 90° C. |
| Longitudinal stretching by a | Factor of 4 |
| Transverse stretching: | Heating fields T = 145° C. |
| Stretching fields | T = 145° C. |
| Transverse stretching by a | Factor of 4 |

The porous film produced in this way had a thickness of about 80 μm and a density of 0.35 g/cm³ and exhibited a uniform white-opaque appearance. The porosity was 56% and the Gurley value was 1040 s.

EXAMPLE 2

A film was produced as described in Example 1. In contrast to Example 1, the β-nucleating agent employed was now 0.3% by weight, based on the weight of the layer, of a dicarboxamide. The porous film produced in this way had a thickness of about 70 μm and a density of 0.40 g/cm³ and exhibited a uniform white-opaque appearance. The porosity was 51% and the Gurley value was 1200 s.

EXAMPLE 3

A film was produced as described in Example 1. In contrast to Example 1, 0.2% by weight of calcium suberate was now employed as β-nucleating agent. The porous film produced in this way had a thickness of about 80 μm and a density of 0.54 g/cm³ and exhibited a uniform white-opaque appearance. The porosity was 37% and the Gurley value was 3600 s.

COMPARATIVE EXAMPLE

An opaque three-layered film having an ABC layer structure and a total thickness of 80 μm was produced by coextrusion and by subsequent step-wise orientation in the longitudinal and transverse directions. The top layers each had a thickness of 0.6 μm.

| | |
|---|---|
| Base layer B (=vacuole-containing layer): | |
| 93% by weight | of propylene homopolymer having a melting point of 165° C. |
| 7.0% by weight | of CaCO3 of the Millicarb type having an average diameter of 3 μm |
| Top layer A | |
| 99.67% by weight | of random ethylene-propylene copolymer having a C2 content of 3.5% by weight |
| 0.33% by weight | of SiO2 as antiblocking agent having an average diameter of 2 μm |
| Top layer B | as top layer A |

The production conditions in the individual process steps were:

| | |
|---|---|
| Extrusion temperatures | 280° C. |
| Temperature of the take-off roll: | 30° C. |
| Longitudinal stretching: temperature: | 122° C. |
| Longitudinal stretching ratio: | 6.0 |
| Transverse stretching: temperature: | 155° C. |
| Transverse stretching ratio: | 8.0 |

-continued

| | |
|---|---|
| Setting: temperature: | 140° C. |
| Convergence: | 15% |

In this way, an opaque vacuole-containing film having a density of 0.6 g/cm3 was obtained. The film was not porous and a Gurley value therefore could not be measured on this film.

Use According to the Invention

The films according to the examples and comparative examples were cut into the shape of labels, provided to the blow-moulding machine as usual and laid in the mould before the blow-moulding process. A blow-moulding machine was fitted with a mould for a wide-waisted bottle. The blow-moulding machine was charged with HD-PE blow-moulding material having an MFI of 0.4 g/10 min. The HDPE was extruded in the form of a tube through an annular die at a material temperature of about 200° C. The mould was closed and the lower end of the melt tube was sealed. A lance was inserted into the upper end of the tube, and the tube was inflated in the mould with a pressure of 10 bar. The mould was subsequently opened and the container removed.

The porous label films according to Examples 1 to 3 were firmly bonded to the container and all exhibited a flaw-free smooth appearance without any signs of orange peel. The opaque vacuole-containing film according to the comparative example was likewise bonded to the container and exhibited the characteristic appearance of orange peel.

The invention claimed is:

1. Process for the production of a labelled container by means of the blow-moulding process, in which a thermoplastic polymer is extruded as melt tube through an annular die into a two-part mould, in which a film or at least one film section has been laid, and the melt tube is squeezed at one end by closing the two-part mould and air is introduced at the opposite end in such a way that the melt tube is inflated and adapts itself to the mould in such a way that a hollow body is shaped, and at the same time the laid-in label is applied, characterized in that the label consists of a biaxially oriented porous film which has an open-pored network-like structure produced during production of the film by conversion of β-crystalline polypropylene into alpha-crystalline polypropylene during the stretching.

2. The process of claim 1, wherein the biaxially oriented porous film comprises a propylene polymer and at least one β-nucleating agent.

3. The process of claim 2, wherein the porosity of the film is in the range from 500 to 1300 Gurley.

4. The process of claim 3, wherein the density of the film is in the range from 0.2 to 0.85 g/cm³.

5. The process of claim 4, wherein the film comprises a propylene homopolymer and/or a propylene block copolymer.

6. The process of claim 5, wherein the film comprises a mixture of propylene homopolymer and propylene block copolymer in a ratio ranging from 90:10 to 10:90.

7. The process of claim 6, wherein the film comprises from 0.001% by weight to 5% by weight—based on the weight of a β-nucleated layer, of β-nucleating agent.

8. The process of claim 7, wherein the nucleating agent is a calcium salt of pimelic acid or of suberic acid or is a carboxamide.

9. The process of claim 8, wherein the film is produced by the stenter process, and the take-off roll temperature is in the range from 60 to 130° C.

10. The process of claim 9, wherein the labelled container by the film does not have an orange peel.

11. The process of claim 1, wherein the porosity of the film is in the range from 500 to 1300 Gurley.

12. The process of claim 11, wherein the film comprises a propylene homopolymer and/or a propylene block copolymer.

13. The process of claim 1, wherein the film comprises a mixture of propylene homopolymer and propylene block copolymer in a ratio ranging from 90:10 to 10:90.

14. The process of claim 1, wherein the film comprises from 0.001% by weight to 5% by weight—based on the weight of a β-nucleated layer, of β-nucleating agent.

15. The process of claim 1, wherein the nucleating agent is a calcium salt of pimelic acid or of suberic acid or is a carboxamide.

16. The process of claim 1, wherein the film is produced by the stenter process, and the take-off roll temperature is in the range from 60 to 130° C.

17. The process of claim 1, wherein the labelled container by the film does not have an orange peel.

* * * * *